United States Patent Office 3,383,873
Patented May 21, 1968

3,383,873
ENGINE EXPANSION OF LIQUEFIED GAS AT BE-
LOW CRITICAL TEMPERATURE AND ABOVE
CRITICAL PRESSURE
Rudolf Becker, Munich-Solln, Germany, assignor to Linde
Aktiengesellschaft, Wiesbaden, Germany
Filed Nov. 3, 1965, Ser. No. 506,229
Claims priority, application Germany, Nov. 3, 1964,
G 41,930
7 Claims. (Cl. 62—11)

ABSTRACT OF THE DISCLOSURE

Liquefying natural gas by the steps of:
(A) Isothermally compressing the natural gas above the critical pressure;
(B) Cooling the compressed gas to sub-critical temperatures;
(C) Engine-expanding resultant cooled fluid in an expansion machine under conditions where no gas phase is formed;
(D) Isobarically cooling resultant engine-expanded liquid; and
(E) Throttling resultant cooled liquid to produce a mixture of liquid and vapor, whereby a minimum of vapor is formed as a result of the expansion steps.

This invention relates to a method and an apparatus for the liquefication of low boiling gases wherein the gas to be liquefied is compressed to above the critical pressure, cooled, and subsequently expanded.

Such processes are generally known in the prior art. In such processes, however, the gas to be liquefied is expanded either completely by throttling or in part by throttling and in part by engine expansion. (The term "engine expansion" refers to the reduction in pressure and the lowering of the temperature of a fluid by the production of external work.) When the engine expansion step has been employed, it has customarily been conducted completely in the region of superheated vapor, with only the throttling expansion being conducted in the liquid-vapor region.

The limitation of the engine expansion step to the region of superheated vapor is explained by the fact that there is a point of view that if engine expansion were conducted in the liquid or liquid-vapor region, excessive shocks from liquid impact would lead to the destruction of the turbines within a short period of time, and that in any event such a step would be less efficient. This point of view dates back to early experiments. For example, Claude and Heylandt in attempting to replace the throttle completely by an expansion machine, in order to liquefy gas, failed because of liquid impact and heat exchange problems during liquefaction. Furthermore, although Kapitza said that liquid air had been produced experimentally from his turbine, such production was at reduced efficiency, and there was difficulty in separating liquid and vapor leaving the turbine ("Expansion Machines for Low Temperature Processes," Collins and Cannady, Oxford University Press, 1958, pp. 72 and 73).

An object of this invention, therefore, is to modify the prior art, and to provide improved processes and apparatuses for low temperature liquefaction.

Upon further study of the specification, drawings, and appended claims, other objects and advantages of this invention will become apparent.

Figure 1:
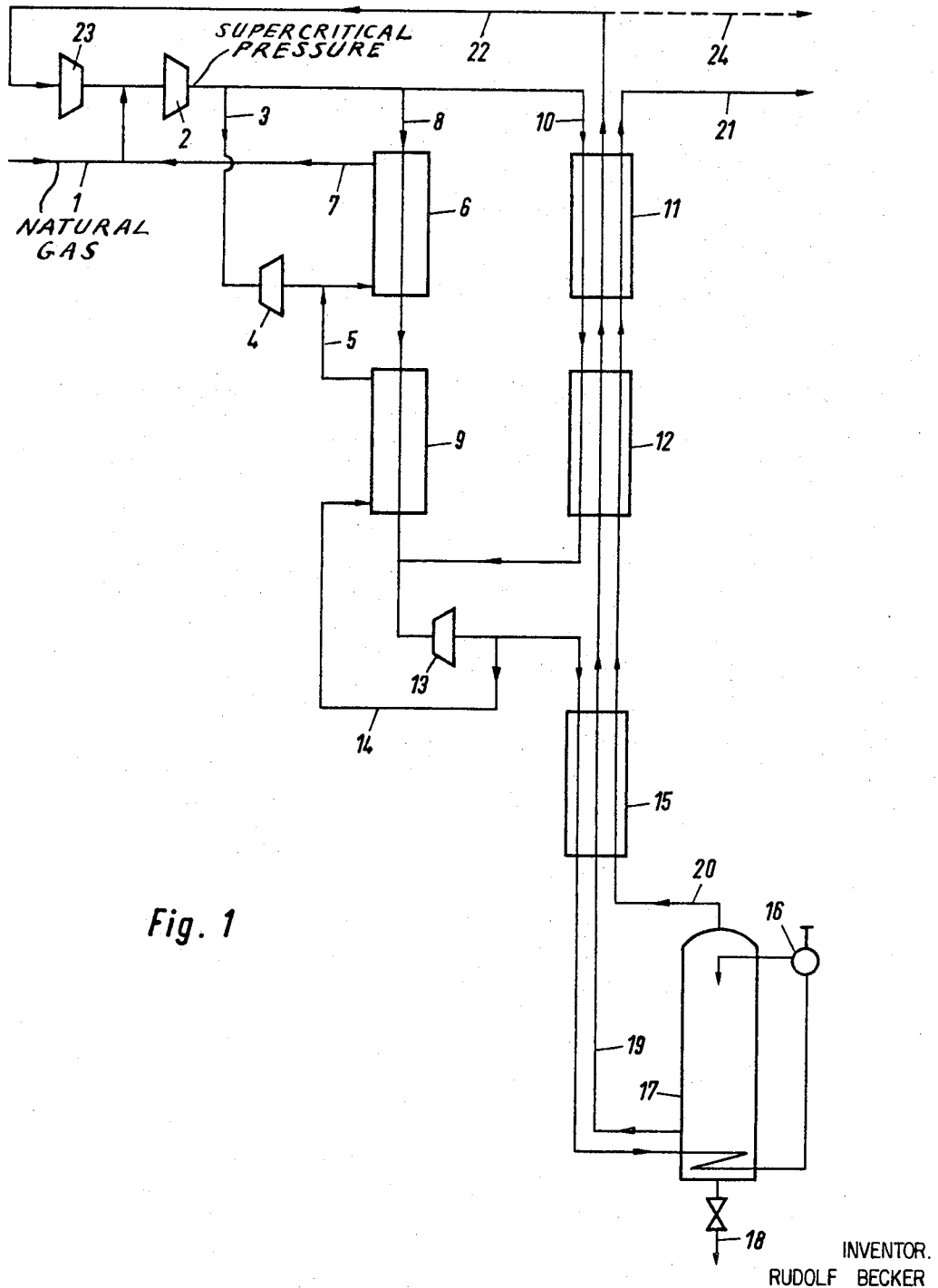
Figure 2:
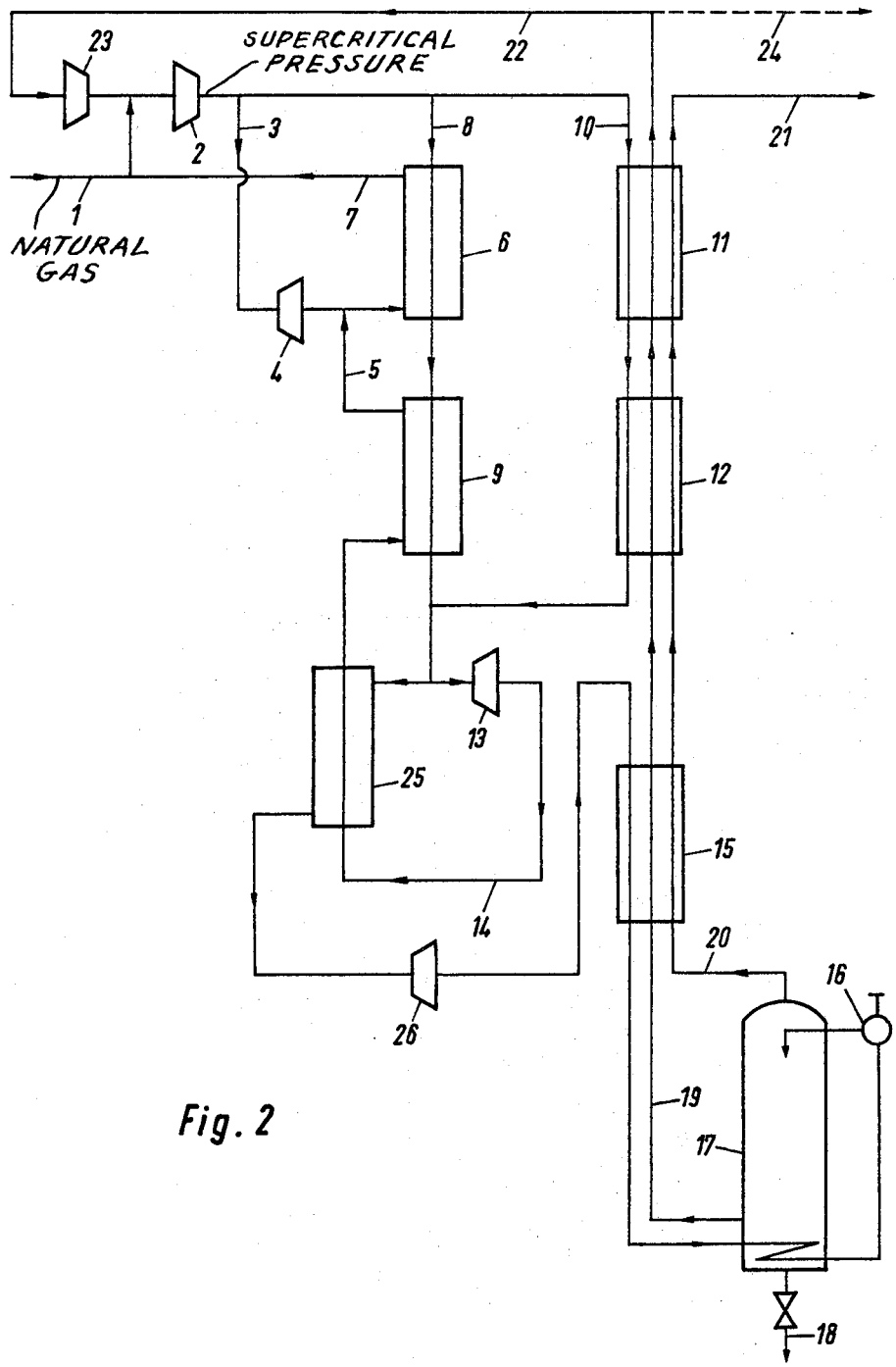
Figure 3:
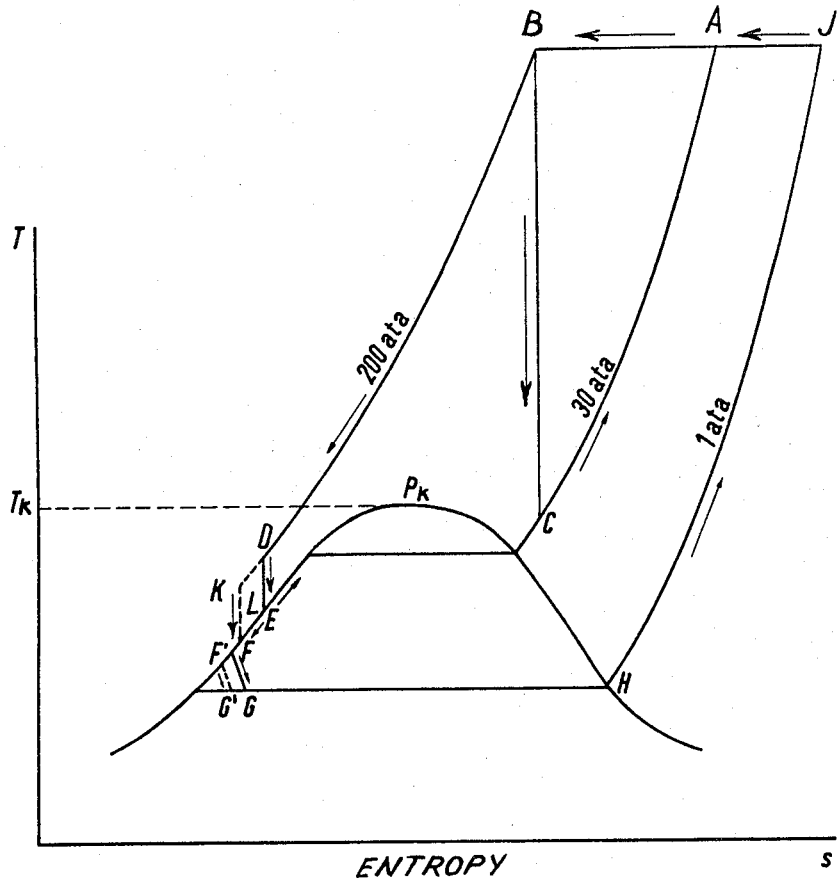

With respect to the drawings, FIGURES 1 and 2 are schematic flowsheets of preferred processes of this invention, as employed to liquefy natural gas; and FIGURE 3 is a temperature-entropy diagram, on which the processes of FIGURES 1 and 2 are traced.

To attain these objects, it has been discovered that economies are realized if the gas is cooled down to below the critical temperature, or to the proximity of the critical temperature, and then is subsequently expanded by engine expansion so that the fluid leaving the engine is either completely or partially in the liquid phase.

By the process of this invention, there is not only achieved an increase in the efficiency of the gas liquefaction process, i.e., the energy requirement for liquefying a predetermined quantity of gas is decreased in comparison to conventional processes, but also substantially smaller amounts of gas are recycled as compared to the conventional methods. With respect to the latter advantage, it is thereby possible to utilize smaller equipment, so as to permit a decrease in the investment costs for newly constructed plants.

According to one embodiment of the inventive idea, the engine expansion in the liquid region can be conducted in one or more stages. (In the liquid region, the "engine expansion" may not result in actual expansion of the liquid, but this term is employed throughout for the sake of simplicity.) If the saturated liquid line (also known as liquid line or liquid curve) is not reached after the engine expansion step, the fluid can be further cooled and can then be expanded by throttling into the liquid-vapor region.

A particular embodiment of the idea of the invention is to engine-expand directly to below the saturated liquid line (if a multi-stage engine expansion, in the last stage), and to separate, in a separator, the liquefied portion of the gas from the vapor portion. In this case, the vapor portion is so minor, and the concomitant minor evaporation phenomenon commences so late when passing through the expansion machine, that erosion phenomena are hardly observed, if at all.

In accordance with a further development of the inventive idea, the gas compressed to a supercritical pressure (i.e., a pressure at which any temperature under the critical temperature will cause liquefaction) can be cooled either by an external refrigerating system and by cold pressure-reduced fluid developed by the process, or only by the latter.

Referring now to the drawings, FIGURE 1 shows a device for liquefying natural gas, with a one-stage engine expansion in the liquid region. Through conduit 1, there are fed 120,000 Nm.³/h. (N refers to volumetric quantities based on a temperature and pressure of 0° C. and 1 atmosphere absolute, respectively) of natural gas to the plant at a pressure of 30 atmospheres absolute, the pressure of the well. The natural gas is then compressed, together with 255,000 Nm.³/h. of recycle gas previously expanded to 30 atm. abs. and 25,000 Nm.³/h. of methane recycle gas previously compressed to 30 atm. abs., in the turbocompressor 2, to a supercritical pressure of 200 atm. abs. From compressor 2, there are passed 170,000 Nm.³/h. of gas via line 3 to the turbine 4, wherein said gas is expanded to the intermediate pressure of 30 atm. abs., then heated in heat exchanger 6 together with 85,000 Nm.³/h. of gas admixed thereto through conduit 5. The resultant heated gas is recycled via conduit 7 to join the natural gas being freshly fed to the plant.

The remainder of the 200 atmosphere natural gas, amounting to 230,000 Nm.³/h., is divided into two partial streams, one of which is passed through conduit 8 to the heat exchangers 6 and 9, and the other of which is passed through conduit 10 to the heat exchangers 11 and 12. The two partial streams are cooled countercurrently with natural gas in liquefied and gaseous state to below, or to the proximity of the critical temperature, i.e., generally not more than about 20° C. above the critical temperature. Thereupon, the two partial streams are joined together and pressure-reduced in the turbine 13 from 200 to 30 atm. abs. without going below the saturated liquid line, so that the resultant fluid is either a saturated or supercooled liquid. Via the conduit 14, 85,000 Nm.³/h. of the pressure-reduced liquid is passed to the heat exchanger 9, to be heated countercurrently with 200 atmosphere gas in conduit 8, and is then withdrawn from the heat exchanger and admixed in conduit 5 with the expanded gas leaving turbine 4.

The remaining 145,000 Nm.³/h. of the liquid leaving turbine 13 at 30 atm. abs. is cooled in heat exchanger 15 and is further pressure-reduced via the throttle valve 16 to a pressure of 1 atm. abs. and passed into the separating column 17. Through conduit 18, there are withdrawn from the separating column 17, 100,000 Nm.³/h. of liquid methane; through conduit 19, 25,000 Nm.³/h. of gaseous methane; and through conduit 20, 20,000 Nm.³/h. of a nitrogen-rich methane fraction. The gaseous methane and the nitrogen-rich methane fraction are separately conducted through the heat exchangers 15, 12, and 11, and during this step are heated to ambient temperature. The nitrogen-rich methane fraction is withdrawn from the plant through conduit 21 at 1 atm. abs. and ambient temperature and can be employed as heating gas. The quantity of 25,000 Nm.³/h. of methane is either recycled into the cycle through conduit 22 and the turbocompressor 23 or, in case it is possible to use it as a heating gas, is withdrawn from the cycle through conduit 24. In the latter case, the turbocompressor would be omitted, and more natural gas of 30 atm. abs. would have to be fed to the cycle.

The device according to FIGURE 2 differs from FIGURE 1 mainly by having the heat exchanger 25 and the turbine 26. In this case, the engine expansion in the liquid region is conducted in two stages.

The liquid at 200 atm. pressure cooled below or to the proximity of the critical temperature is divided in front of the turbine 13. A first portion is engine-expanded in the turbine 13, as in FIGURE 1. A second portion is further cooled in the heat exchanger 25 by engine-expanded first portion passed from turbine 13 through line 14 to the heat exchanger 25. Subsequently, this second portion is likewise pressure-reduced to 30 atm. abs. in the turbine 26, again cooled in heat exchanger 15, and expanded to 1 atm. abs. via the throttle 16 into the separating column 17.

FIGURE 3 shows the processes for liquefying natural gas according to the devices illustrated in FIGURES 1 and 2 in a substantially simplified manner in the temperature-entropy diagram.

From A to B, the natural gas of 30 atm. abs. is isothermally compressed in the turbocompressor 2 to 200 atm. abs. An amount of 170,000 Nm.³/h. is expanded, from B to C, in the turbine 4 to 30 atm. abs., and from C to A again heated isobarically in the countercurrent heat exchanger 6. 230,000 Nm.³/h. are cooled isobarically in exchangers 6 and 9 from B to D to a sub-critical temperature, engine-expanded from D to E in the turbine 13 to 30 atm. abs., and then divided. A portion is heated in the heat exchanger 9 to C, and then in the heat exchanger 6 to A. The other portion is cooled in heat exchanger 15 from E to F, and subsequently expanded in the throttle 16 to 1 atm. abs. to G. The produced vapor is heated isobarically in heat exchangers 15, 12, and 11 from H to J. One portion—the gaseous methane—can then again be compressed isothermally to 30 atm. abs. from J to A in the turbocompressor 23.

The dashed lines in the T–s diagram represent the course of the process with a two-stage engine expansion which is different as compared to the process with a one-stage expansion. In this case, a portion of the gas cooled from B to D would be further cooled in the heat exchanger 25 from D to K, expanded by engine expansion from K to L in the turbine 26, and further cooled from L to F' in the heat exchanger 15. Point F thus would have shifted on the saturated liquid line to a lower temperature down to F', and the throttle expansion would then lead to point G', which would cause an even further increase in the quantity of liquefied methane.

The question whether a multi-stage engine expansion is advantageous in comparison with a one-stage engine expansion process is solely an economical one, for with each increase in the number of stages, the point G is shifted more to the left, i.e., the proportion of the liquefied methane is larger, but of course the expenses for building the plant likewise grow with an increasing number of stages. The optimum number of stages thus will be determined on a case-by-case basis. However, the number of stages is for practical purposes limited by the amount of throughput necessary for each expansion turbine, which amount decreases as the number of stages increases. (The size of the turbine cannot be scaled down to very small sizes without creating serious problems.)

From the T–s diagram, it can also be seen that the process of the invention increases the efficiency of a gas liquefaction process. During the expansion into the liquid-vapor region, the point G or G' on the liquid-vapor isobar 1 atm. abs. is reached. This point is positioned substantially closer to the saturated liquid line than the corresponding points of the known processes, because of the cooling before engine expansion to below the critical temperature or to the proximity of the critical temperature. The closer the point G or G' is to the saturated liquid line, the higher is the liquefied portion of the gas after the expansion step into the vapor-liquid region, and the smaller is the vapor portion. This means that, firstly, a larger portion of the gas fed to the plant can be withdrawn as liquid final product, and secondly, less low pressure vapor of 1 atm. abs. must be recompressed to intermediate or high pressures.

Whereas this invention has been described primarily with respect to liquefaction of natural gas and is particularly advantageous therefor, it is also useful for the liquefaction of other gases, such as the liquefaction of large quantities of air, etc.

From the foregoing description, one skilled in the art can easily ascertain the essential characteristics of this invention, and without departing from the spirit and scope thereof, can make various changes and modifications of the invention to adapt it to various usage and conditions. Consequently, such changes and modifications are properly, equitably, and intended to be, within the full range of equivalence of the following claims.

What is claimed is:

1. In a process for the low temperature liquefaction of a gas, the steps comprising:
   (a) compressing said gas to a pressure above the critical pressure of the gas;
   (b) isobarically cooling resultant compressed gas to a temperature below the critical temperature;
   (c) engine-expanding resulting cooled fluid in an expansion machine under conditions wherein only liquefied gas is present in said expansion machine;
   (d) isobarically cooling resultant engine-expanded cooled fluid; and
   (e) throttling resultant cooled engine-expanded cooled fluid to produce a mixture of liquid and vapor, whereby the saturated liquid line is penetrated.

2. A process as defined by claim 1 wherein step (c) is conducted in a plurality of expansion machines.

3. A process as defined by claim 1 wherein the cooling step (b) is conducted by dividing the gas compressed to above the critical pressure into a plurality of streams, of which:
   a first partial stream is engine-expanded to cool same, passed into indirect heat exchange with another partial stream, and the resultant warmed first partial stream is recycled into the gas stream to be compressed; and said another partial stream is cooled by the first partial stream and by engine-expanded fluid of step (c).

4. A process as defined by claim 1, wherein a portion of the engine-expanded fluid from step (c) is utilized as a cooling medium for step (b), and another portion of said engine expanded fluid is further cooled by vapor from step (e).

5. In a process as defined by claim 1 wherein a portion of cooled fluid from step (b) is further cooled by the fluid expanded in step (c), engine expanding resultant further cooled portion of fluid in a second expansion stage, and cooling resultant engine expanded fluid with vapor from step (e).

6. A process as defined by claim 1 wherein the gas is natural gas.

7. A process as defined by claim 6, further comprising the step of passing said mixture of liquid and vapor into a separating column, and withdrawing from the column liquid methane fraction, gaseous methane fraction, and nitrogen-rich methane fraction, and passing the last two fractions in indirect heat exchange relationship with compressed natural gas from step (a) in order to cool same.

References Cited

UNITED STATES PATENTS

| | | |
|---|---|---|
| 2,900,797 | 8/1959 | Kurata et al. |
| 2,901,326 | 8/1959 | Kurata et al. |
| 2,915,882 | 12/1959 | Schuftan et al. _____ 62—38 X |
| 2,924,078 | 2/1960 | Tsunoda _____ 62—38 |
| 3,098,732 | 7/1963 | Dennis _____ 62—38 X |
| 3,203,191 | 8/1965 | French _____ 62—38 X |
| 3,216,206 | 11/1965 | Kessler _____ 62—38 X |
| 3,236,057 | 2/1966 | Tafreshi _____ 62—38 X |
| 3,292,380 | 12/1966 | Bucklin _____ 62—23 X |
| 3,292,381 | 12/1966 | Bludworth _____ 62—27 X |
| 2,954,677 | 10/1960 | Simonet _____ 62—38 XR |

NORMAN YUDKOFF, *Primary Examiner.*

V. PRETKA, *Assistant Examiner.*